(12) United States Patent
Hua et al.

(10) Patent No.: US 12,367,121 B1
(45) Date of Patent: Jul. 22, 2025

(54) RAID CONFIGURATION AND SPARE CAPACITY ASSIGNMENT WITH RECOVERABILITY FROM MULTIPLE SEQUENTIAL FAILURES

(71) Applicant: Dell Products L.P., Hopkinton, MA (US)

(72) Inventors: Kuolin Hua, Natick, MA (US); Kunxiu Gao, Boxborough, MA (US)

(73) Assignee: Dell Products L.P., Hopkinton, MA (US)

( * ) Notice: Subject to any disclaimer, the term of this patent is extended or adjusted under 35 U.S.C. 154(b) by 0 days.

(21) Appl. No.: 18/418,526

(22) Filed: Jan. 22, 2024

(51) Int. Cl.
*G06F 11/00* (2006.01)
*G06F 11/20* (2006.01)

(52) U.S. Cl.
CPC .............................. *G06F 11/2089* (2013.01)

(58) Field of Classification Search
CPC ............ G06F 11/2089; G06F 11/0727; G06F 11/1076; G06F 11/1088; G06F 11/1092; G06F 11/2053; G06F 11/2094
See application file for complete search history.

(56) References Cited

U.S. PATENT DOCUMENTS

| | | | |
|---|---|---|---|
| 6,529,997 B1 * | 3/2003 | Debiez | G06F 3/064 |
| | | | 714/E11.034 |
| 11,144,396 B1 * | 10/2021 | Hua | G06F 11/2094 |
| 2021/0004291 A1 * | 1/2021 | Govindan | G06F 3/0689 |
| 2022/0066878 A1 * | 3/2022 | Hua | G06F 11/0727 |

* cited by examiner

*Primary Examiner* — Joseph D Manoskey
(74) *Attorney, Agent, or Firm* — Anderson Gorecki LLP (57) ABSTRACT

Sequentially ordered groups of same-size cells are distributed in a drive array representative matrix as group number= ((row number−1)+(column number−1)) modulo (N), where N is the total number of drives. A plurality of the groups are reserved as spare groups. Responsive to a drive failure, one of the spare groups is selected, an ordered target list of spare cells is created, an ordered source list of cells containing protection group members on the failed drive is created, and the spare cells are assigned to the cells containing protection group members on the failed drive, where the protection group members are rebuilt. The target list starts at the spare cell having the minimum drive index that is greater than the failed drive index. The source list is ordered by either sequential cell indices or alphabetically by group-representing letters.

20 Claims, 9 Drawing Sheets

Figure 1

RAID Protection Group 207

Storage Resource Pool 205

Production Volume 240

| row/col. | 1 | 2 | 3 | 4 | 5 |   | 1 | 2 | 3 | 4 | 5 |
|---|---|---|---|---|---|---|---|---|---|---|---|
| 1 | 0 | 1 | 2 | 3 | 4 | > | a | b | c | d | e |
| 2 | 1 | 2 | 3 | 4 | 5 |   | b | c | d | e | f |
| 3 | 2 | 3 | 4 | 5 | 6 |   | c | d | e | f | g |
| 4 | 3 | 4 | 5 | 6 | 0 |   | d | e | f | g | a |
| 5 | 4 | 5 | 6 | 0 | 1 |   | e | f | g | a | b |
| 6 | 5 | 6 | 0 | 1 | 2 |   | f | g | a | b | c |
| 7 | 6 | 0 | 1 | 2 | 3 |   | g | a | b | c | d |

Figure 5A

| disk/cell | 1 | 2 | 3 | 4 | 5 |
|---|---|---|---|---|---|
| 1 | a | b | c | d | e |
| 2 | b | c | d | e | f |
| 3 | c | d | e | f | g |
| 4 | d | e | f | g | a |
| 5 | e | f | g | a | b |
| 6 | f | g | a | b | c |
| 7 | g | a | b | c | d |

Figure 5B

| disk/cell | 1 | 2 | 3 | 4 | 5 |
|---|---|---|---|---|---|
| 1 | a | b | c |   | e |
| 2 | b | c | a | e | f |
| 3 | c | b | e | f | g |
| 4 | c | e | f | g | a |
| 5 | e | f | g | a | b |
| 6 | f | g | a | b | c |
| 7 | g | a | b | c | e |

Figure 6A

| disk/cell | 1 | 2 | 3 | 4 | 5 |
|---|---|---|---|---|---|
| 1 | a | b | c |   | e |
| 2 | b | c | a | e | f |
| 3 | c | b | e | f | a |
| 4 | c | e | f |   | a |
| 5 | e | f | c | a | b |
| 6 | f | e | a | b | c |
| 7 | f | a | b | c | e |

Figure 6B

| disk/cell | 1 | 2 | 3 | 4 | 5 |
|---|---|---|---|---|---|
| 1 | a | b | c |   | e |
| 2 | b | c | a | e | f |
| 3 | c | b | e | f | a |
| 4 | c | e | f | b | a |
| 5 | e | f | c | a | b |
| 6 | f | e | a | b | c |
| 7 | f | a | b | c | e |

Figure 6C

| disk/cell | 1 | 2 | 3 | 4 | 5 |
|---|---|---|---|---|---|
| 1 | a | b | c | d | e |
| 2 | b | c | d | e | f |
| 3 | c | d | e | f | g |
| 4 | d | e | f | g | h |
| 5 | e | f | g | h | a |
| 6 | f | g | h | a | b |
| 7 | g | h | a | b | c |
| 8 | h | a | b | c | d |

\>

| d/c | 1 | 2 | 3 | 4 | 5 |
|---|---|---|---|---|---|
| 1 | a | b | c | d |   |
| 2 | b | c | d |   | f |
| 3 | c | d |   | f | g |
| 4 | d |   | f | g | h |
| 5 |   | f | g | h | a |
| 6 | f | g | h | a | b |
| 7 | g | h | a | b | c |
| 8 | h | a | b | c | d |

\>

| d/c | 1 | 2 | 3 | 4 | 5 |
|---|---|---|---|---|---|
| 1 | a | b | c | d | h |
| 2 | b | c | d | a | f |
| 3 | c | d | b | f | g |
| 4 | d | c | f | g | h |
| 5 | d | f | g | h | a |
| 6 | f | g | h | a | b |
| 7 | g | h | a | b | c |
| 8 | h | a | b | c | d |

Figure 7

| disk/cell | 1 | 2 | 3 | 4 | 5 |
|---|---|---|---|---|---|
| 1 | a | b | c | d | e |
| 2 | b | c | d | e | f |
| 3 | c | d | e | f | g |
| 4 | d | e | f | g | a |
| 5 | e | f | g | a | b |
| 6 | f | g | a | b | c |
| 7 | g | a | b | c | d |

>

| d/c | 1 | 2 | 3 | 4 | 5 |
|---|---|---|---|---|---|
| 1 | a | b | c | d | f |
| 2 | b | c | d | g | f |
| 3 | c | d |   | f | g |
| 4 | d | c | f | g | a |
| 5 | d | f | g | a | b |
| 6 | f | g | a | b | c |
| 7 | g | a | b | c | d |

Figure 8

| disk/cell | 1 | 2 | 3 | 4 | 5 |
|---|---|---|---|---|---|
| 1 | a | b | c | d | e |
| 2 | b | c | d | e | f |
| 3 | c | d | e | f | g |
| 4 | d | e | f | g | h |
| 5 | e | f | g | h | a |
| 6 | f | g | h | a | b |
| 7 | g | h | a | b | c |
| 8 | h | a | b | c | d |

\>

| d/c | 1 | 2 | 3 | 4 | 5 |
|---|---|---|---|---|---|
| 1 | a | b | c | d |   |
| 2 | b | c | d |   | f |
| 3 | c | d |   | f | g |
| 4 | d |   | f | g | h |
| 5 |   | f | g | h | a |
| 6 | f | g | h | a | b |
| 7 | g | h | a | b | c |
| 8 | h | a | b | c | d |

\>

| d/c | 1 | 2 | 3 | 4 | 5 |
|---|---|---|---|---|---|
| 1 | a | b | c | d | f |
| 2 | b | c | d | g | f |
| 3 | c | d |   | f | g |
| 4 | d | c | f | g | h |
| 5 | d | f | g | h | a |
| 6 | f | g | h | a | b |
| 7 | g | h | a | b | c |
| 8 | h | a | b | c | d |

Figure 9A

| disk/cell | 1 | 2 | 3 | 4 | 5 |
|---|---|---|---|---|---|
| 1 | a | b | c | d | f |
| 2 | b | c | d | g | f |
| 3 | d | c | f | g | h |
| 4 | d | f | g | h | a |
| 5 | f | g | h | a | b |
| 6 | g | h | a | b | c |
| 7 | h | a | b | c | d |

\>

| d/c | 1 | 2 | 3 | 4 | 5 |
|---|---|---|---|---|---|
| 1 | a | b | c | d | f |
| 2 | b | c | d | g | f |
| 3 | d | c | f | g | h |
| 4 | d | f |   | h | a |
| 5 | f | g | h | a | b |
| 6 | g | h | a | b | c |
| 7 | h | a | b | c | d |

\>

| d/c | 1 | 2 | 3 | 4 | 5 |
|---|---|---|---|---|---|
| 1 | a | b | c | d | f |
| 2 | b | c | d | h | f |
| 3 | d | c | f | a | h |
| 4 | d | f |   | h | a |
| 5 | f | d | h | a | b |
| 6 | f | h | a | b | c |
| 7 | h | a | b | c | d |

Figure 9B

RAID CONFIGURATION AND SPARE CAPACITY ASSIGNMENT WITH RECOVERABILITY FROM MULTIPLE SEQUENTIAL FAILURES

TECHNICAL FIELD

The subject matter of this disclosure is generally related to electronic data storage systems.

BACKGROUND

Institutional data storage systems use Redundant Array of Independent Disks (RAID) technology to maintain data availability and avoid data loss. Each disk drive in an array is organized into a plurality of same-size cells that are either allocated for storing protection group members or reserved as spare storage capacity. Each RAID protection group enables a failed member to be rebuilt in a spare cell using the remaining non-failed members. A RAID (D+P) protection group has D data members and P parity members. The data members store data. The parity members store non-data parity information such as XORs of the data values on the data members. A failed data member can be rebuilt from the non-failed data members and the parity information. A failed parity member can be rebuilt from the data members. Maintaining the members of a RAID protection group on different disk drives avoids data loss when one of the drives fails.

SUMMARY

In accordance with some embodiments, an apparatus comprises at least one compute node configured to manage access of the non-volatile drives, the at least one compute node comprising at least one processor and non-transitory computer-readable memory; and a Redundant Array of Independent Drives (RAID) controller adapted to: configure the drives with same-size cells as elements of a matrix adapted to be represented by sequentially numbered drive rows and sequentially numbered cell index columns, sequentially numbered groups of the cells distributed along matrix diagonals characterized by sequentially increasing cell indices and sequentially decreasing drive indices, both wrapping; reserve a plurality of the groups as spare groups; and responsive to failure of one of the drives: select one of the spare groups; create an ordered target list of spare cells of the selected spare group; create an ordered source list of cells containing protection group members on the failed drive; and assign ones of the spare cells to ones of the cells containing protection group members on the failed drive and rebuild the protection group members in the assigned spare cells.

In accordance with some embodiments, a method comprises configuring an array of non-volatile drives with same-size cells as elements of a matrix adapted to be represented by sequentially numbered drive rows and sequentially numbered cell index columns, sequentially numbered groups of the cells distributed along matrix diagonals characterized by sequentially increasing cell indices and sequentially decreasing drive indices, both wrapping; reserving a plurality of the groups as spare groups; and responsive to failure of one of the drives: selecting one of the spare groups; creating an ordered target list of spare cells of the selected spare group; creating an ordered source list of cells containing protection group members on the failed drive; and assigning ones of the spare cells to ones of the cells containing protection group members on the failed drive and rebuild the protection group members in the assigned spare cells.

In accordance with some embodiments, a non-transitory computer-readable storage medium stores instructions that when executed by a computer perform a method comprising configuring an array of non-volatile drives with same-size cells as elements of a matrix adapted to be represented by sequentially numbered drive rows and sequentially numbered cell index columns, sequentially numbered groups of the cells distributed along matrix diagonals characterized by sequentially increasing cell indices and sequentially decreasing drive indices, both wrapping; reserving a plurality of the groups as spare groups; and responsive to failure of one of the drives: selecting one of the spare groups; creating an ordered target list of spare cells of the selected spare group; creating an ordered source list of cells containing protection group members on the failed drive; and assigning ones of the spare cells to ones of the cells containing protection group members on the failed drive and rebuild the protection group members in the assigned spare cells.

The summary does not limit the scope of the claims or the disclosure. All examples, embodiments, aspects, implementations, and features can be combined in any technically possible way and the method and process steps may be performed in any order.

Various features and advantages will become more apparent from the following detailed description of exemplary embodiments in conjunction with the drawings.

DETAILED DESCRIPTION

The terminology used in this disclosure is intended to be interpreted broadly within the limits of subject matter eligibility. The terms "disk," "drive," and "disk drive" are used interchangeably to refer to non-volatile storage media and are not intended to refer to any specific type of non-volatile storage media. The terms "logical" and "virtual" are used to refer to features that are abstractions of other features, e.g., and without limitation abstractions of tangible features. The term "physical" is used to refer to tangible features that possibly include, but are not limited to, electronic hardware. For example, multiple virtual computers could operate simultaneously on one physical computer. The term "logic" is used to refer to special purpose physical circuit elements, firmware, software, computer instructions that are stored on a non-transitory computer-readable medium and implemented by multi-purpose tangible processors, and any combinations thereof. Aspects of the inventive concepts are described as being implemented in a data storage system that includes host servers and a storage array. Such implementations should not be viewed as limiting. Those of ordinary skill in the art will recognize that there are a wide variety of implementations of inventive concepts in view of the teachings of the present disclosure.

Some aspects, features, and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory computer-readable medium. Furthermore, it will be understood by those of ordinary skill in the art that the computer-executable instructions may be executed on a variety of tangible processor devices, i.e., physical hardware. For practical reasons, not every step, device, and component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

Figure 1:
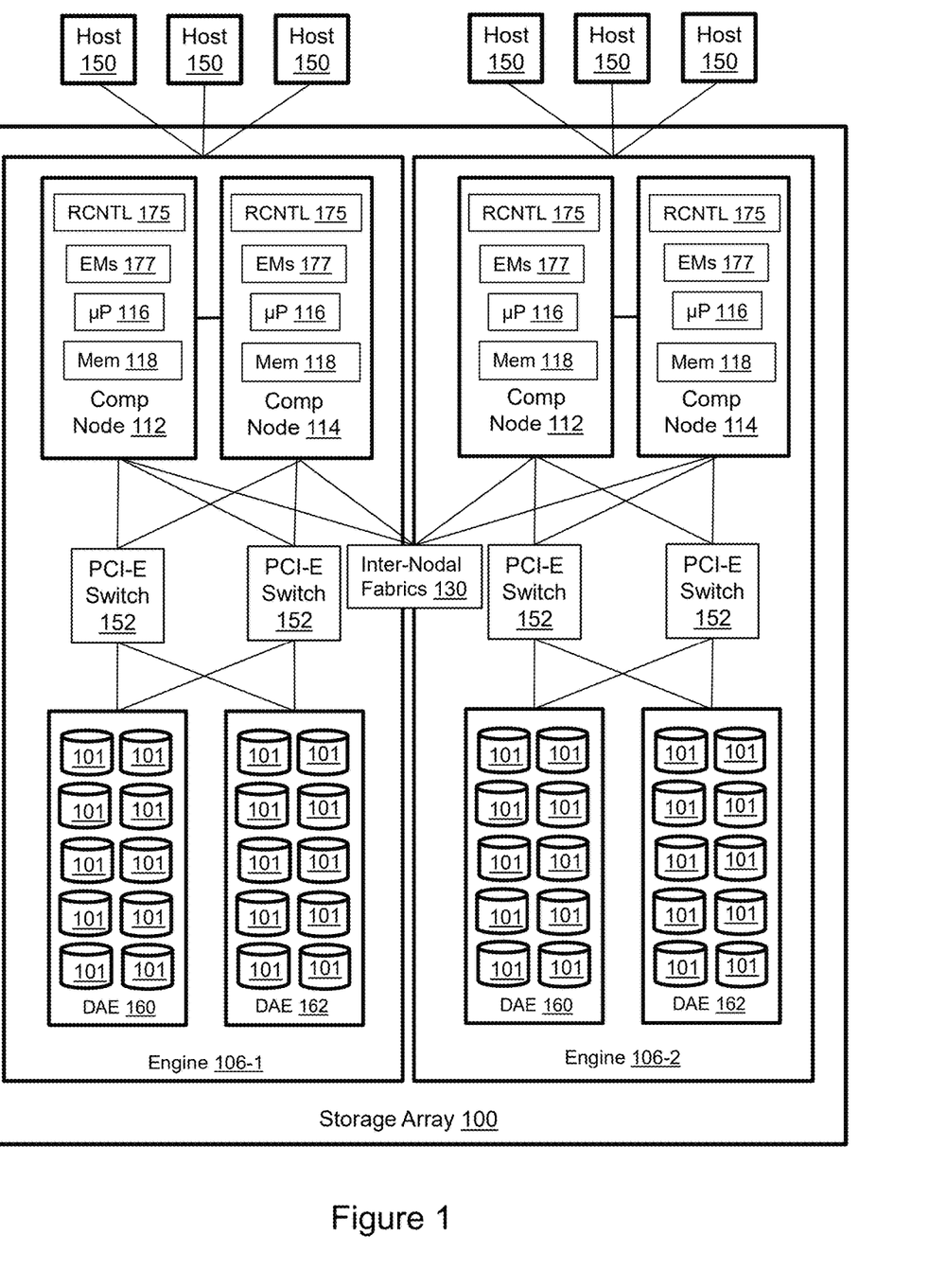
FIG. 1 illustrates a storage array with RAID controllers that facilitate recovery from multiple sequential drive failures.

FIG. 1 illustrates a storage array 100 with RAID controllers 175 that facilitate recovery from multiple sequential drive failures. The illustrated storage array includes two engines 106-1, 106-2. However, the storage array might include any number of engines. Each engine includes disk array enclosures (DAEs) 160, 162 and a pair of peripheral component interconnect express (PCI-e) interconnected compute nodes 112, 114 (aka storage directors) in a failover relationship. Within each engine, the compute nodes and DAEs are interconnected via redundant PCI-E switches 152. Each DAE includes managed drives 101 that are non-volatile storage media that may be of any type, e.g., solid-state drives (SSDs) based on nonvolatile memory express (NVMe) and EEPROM technology such as NAND and NOR flash memory. Each compute node is implemented as a separate printed circuit board and includes resources such as at least one multi-core processor 116 and local memory 118. Processor 116 may include central processing units (CPUs), graphics processing units (GPUs), or both. The local memory 118 may include volatile media such as dynamic random-access memory (DRAM), non-volatile memory (NVM) such as storage class memory (SCM), or both. Each compute node allocates a portion of its local memory 118 to a shared memory that can be accessed by all compute nodes of the storage array. Each compute node includes one or more adapters and ports for communicating with host servers 150 for servicing IOs from the host servers. Each compute node also includes one or more adapters for communicating with other compute nodes via redundant inter-nodal channel-based InfiniBand fabrics 130.

Each compute node 112, 114 runs emulations (EMs 177) for completing different storage-related tasks and functions. Front-end emulations handle communications with the host servers 150. For example, front-end emulations receive IO commands from host servers and return data and write acknowledgements to the host servers. Back-end emulations handle communications with managed drives 101 in the DAEs 160, 162. Data services emulations process IOs. Remote data services emulations handle communications with other storage systems, e.g., other storage arrays for remote replication and remote snapshot creation. RAID controllers 175 may include one or more of special purpose electronic components, logic, and computer program code loaded into memory 118 from the managed drives 101 and run on the processors 116. The RAID controllers 175 coordinate with the emulations 177 to facilitate recovery from multiple sequential drive failures.

Figure 2:
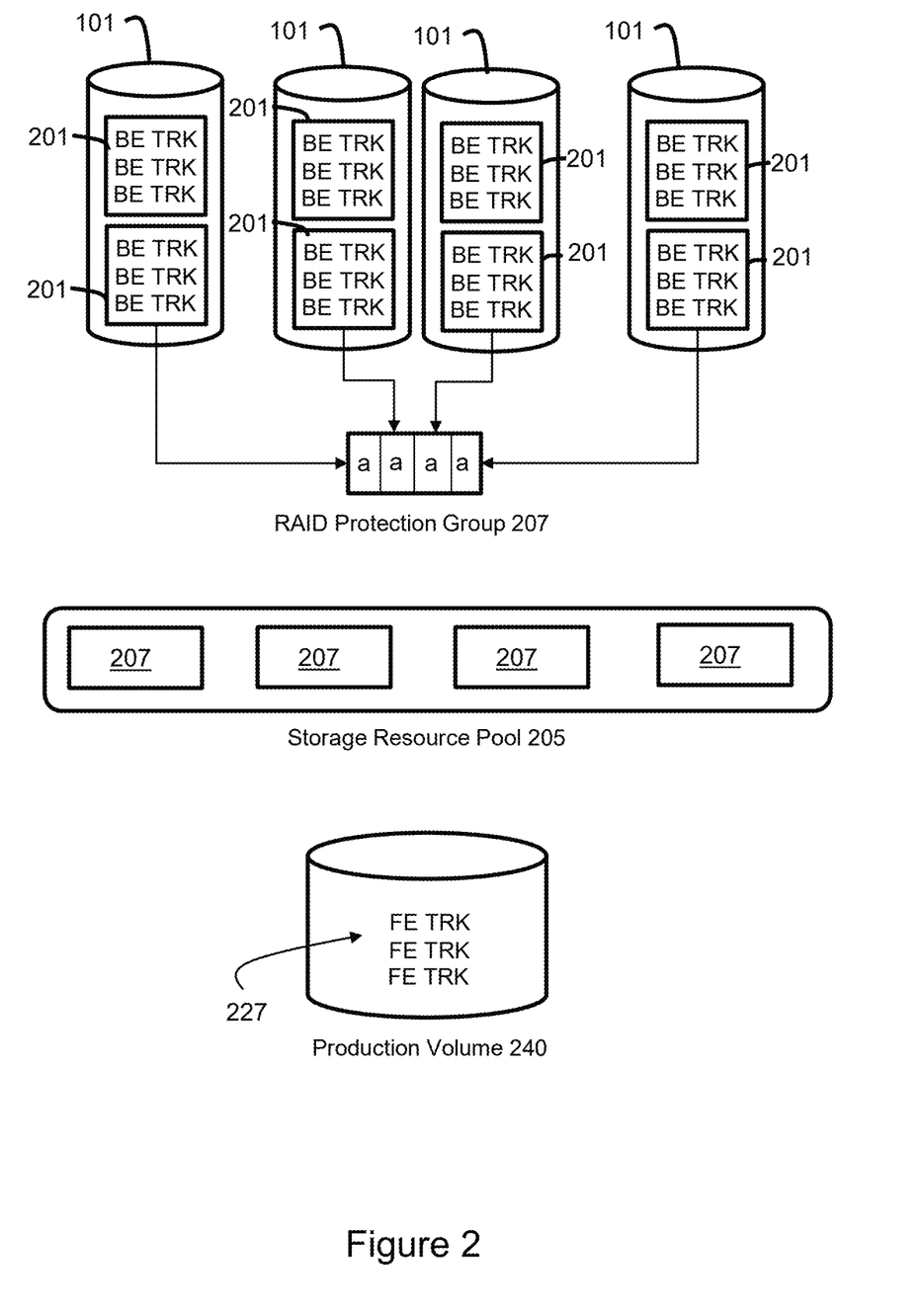
FIG. 2 illustrates layers of abstraction between the managed drives and the production volume of the storage array of FIG. 1.

Referring to FIGS. 1 and 2, data that is created and used by instances of the host applications running on the host servers 150 is maintained on the managed drives 101. The managed drives are not discoverable by the host servers, so the storage array creates logical production storage objects such as production volume 240 that can be discovered and accessed by the host servers. Without limitation, a production storage object may be referred to as a source device, production device, production volume, or production LUN, where the logical unit number (LUN) is a number used to identify logical storage volumes in accordance with the small computer system interface (SCSI) protocol. From the perspective of the host servers 150, each production storage object is a single disk drive having a set of contiguous fixed-size logical block addresses (LBAs) on which data used by the instances of one of the host applications resides. However, the host application data is stored at non-contiguous addresses on various managed drives 101. IO services emulations running on the processors of the compute nodes maintain metadata that maps between the LBAs of the production volume 240 and physical addresses on the managed drives 101 in order to process IOs from the host servers.

The basic allocation unit of storage capacity that is used by the compute nodes 112, 114 to access the managed drives is a back-end track (BE TRK). The managed drives are organized into same-size cells 201, each of which may contain multiple BE TRKs. Although individual drives can be configured as RAID group members, in the illustrated example a cell grouping "a" containing multiple cells 201 from different managed drives is used to create a RAID protection group, such as a RAID-5 (3+1) protection group 207. In order to be RAID-compliant, each member of a given protection group must be on a different managed drive. In the illustrated example, each cell 201 contains one member of protection group "a" stored on a particular managed drive and other protection groups, e.g., b, c, d, and so forth, would be similarly formed. Storage resource pool 205 is a type of storage object that includes a collection of protection groups of the same RAID level. The host application data is logically stored in front-end tracks (FE TRKs) on production volume 240. The FE TRKs of the production volume are mapped to the BE TRKs on the managed drives and vice versa by tables and pointers that are maintained in the shared memory.

Figure 3:
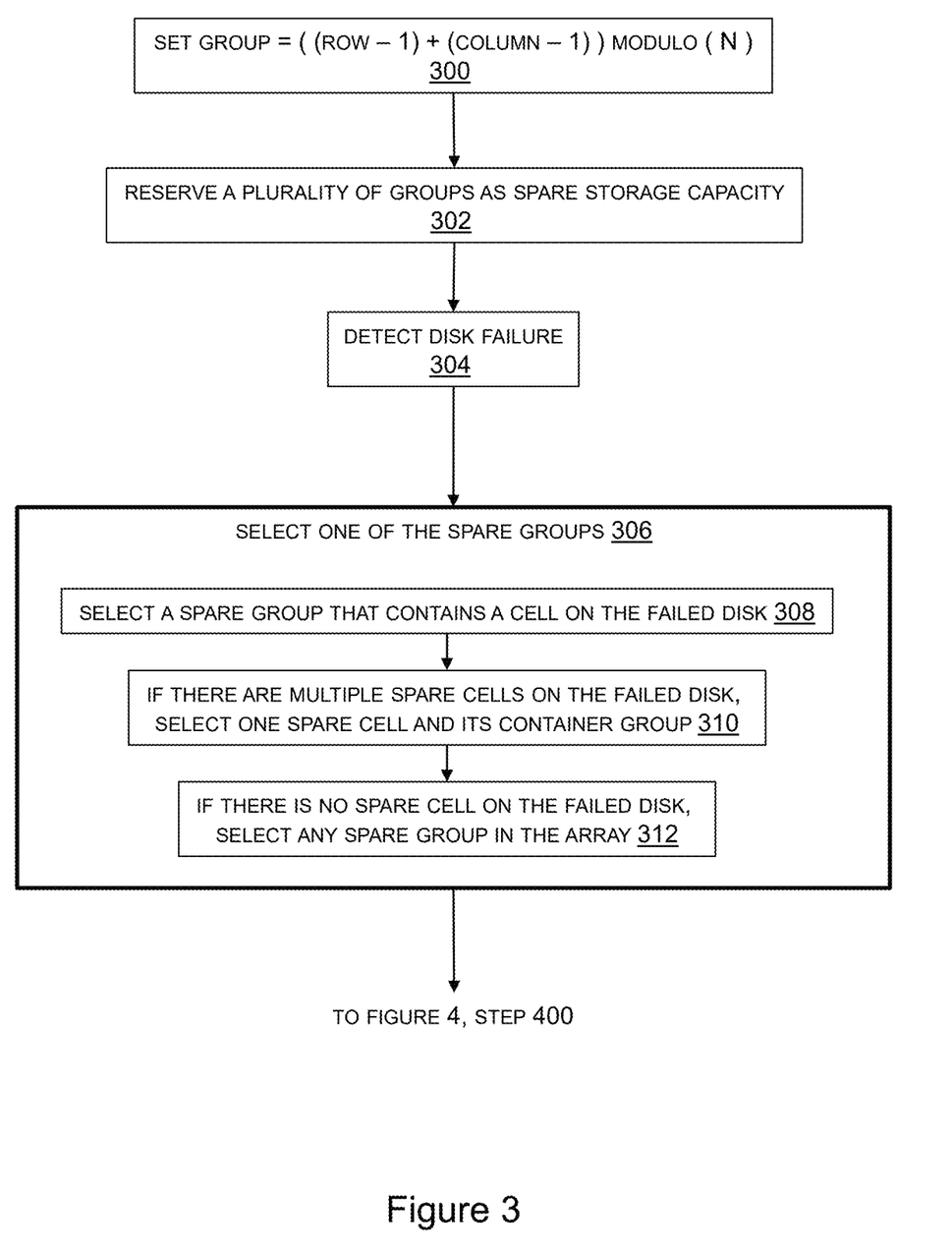
FIGS. 3 and 4 illustrate a method of distributing protection group members and spare groups and subsequently assigning spare capacity to rebuild protection group members in the event of multiple sequential drive failures.
Figure 4:
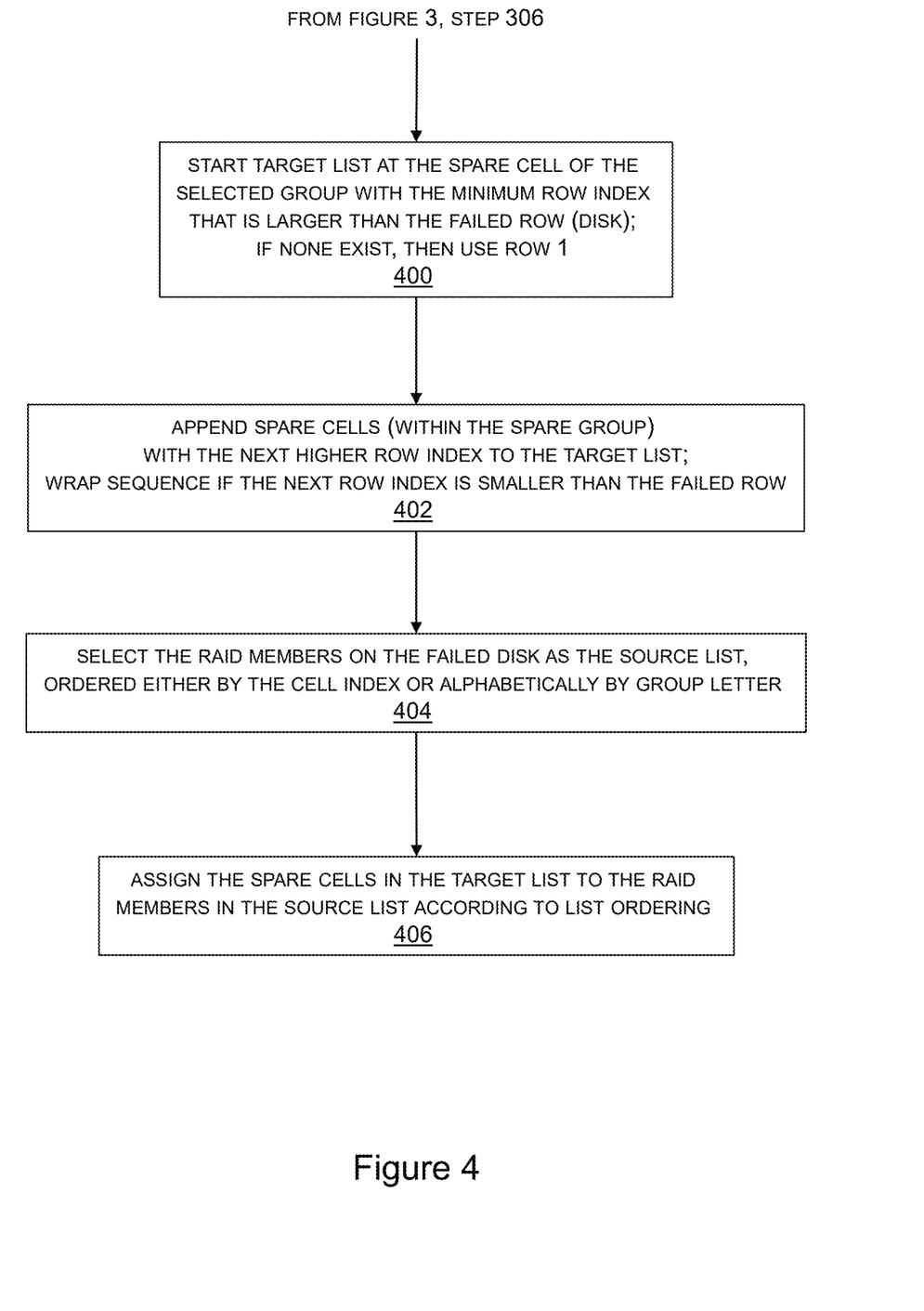

FIGS. 3 and 4 illustrate a method of distributing protection group members and spare groups and subsequently assigning spare capacity to enable rebuilding of protection group members in the event of multiple sequential drive failures. The method may be implemented by the RAID controllers. The storage capacity of the array is modeled as a matrix with rows that represent the disks, columns that represent cell indices, and sequentially numbered groups of same-size cells as elements. For example, a matrix that represents an array of seven disks that each have five cells would have sequential rows numbered 1 through 7 that represent the seven disks and sequential columns numbered 1 through 5 that represent the five cells that each of the disks includes. As shown in step 300, cell group elements represented by sequential integers starting with 0 are assigned to the cells in the matrix such that:

Group=((Row−1)+(Column−1)) modulo (N), where
Group=group number,
Row=disk index,
Column=cell index,
N=number of disks in the array, and
N≥Width+Spare, where
Width=RAID width (number of RAID group members), e.g. Width=5 for RAID 5 (4+1), and
Spare=spare capacity, e.g. Spare=2 for recoverability of up to 2 disk failures.

Figure 5A:
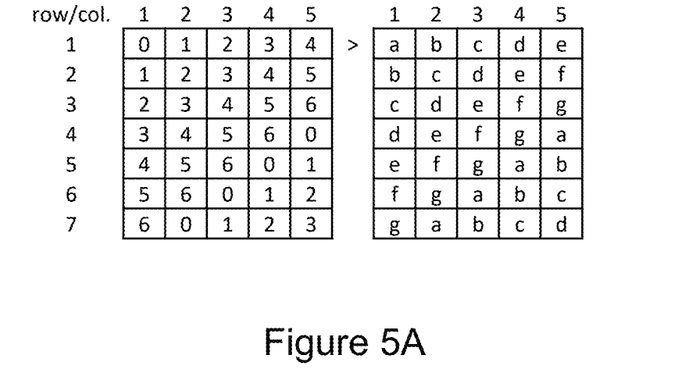
FIG. 5A illustrates an initial distribution of groups across the cells in a matrix representation.

An example of such a distribution of RAID 5 (4+1) groups over seven disks is shown in the left-side matrix of FIG. 5A. There are seven RAID groups (0-6) that are distributed along matrix diagonals characterized by sequentially increasing cell/column indices and sequentially decreasing disk/row indices, both wrapping. The RAID groups (0-6) may also be represented as (a-g) in alphabetical order where letters a-g correspond to numbers 0-6 as shown in the right-side matrix.

Figure 5B:
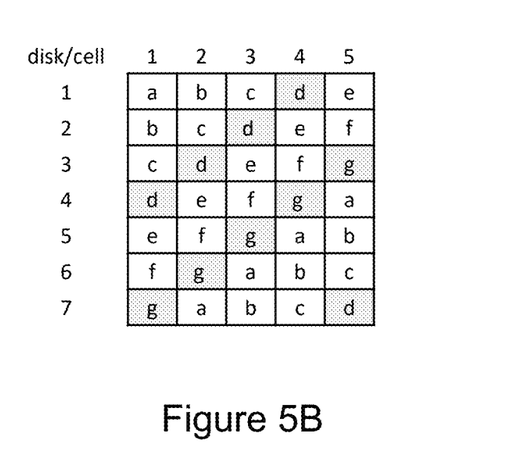
FIG. 5B illustrates allocation of groups for spare capacity and storage of RAID members.

Referring again to FIG. 3, a plurality of the groups are selected and reserved as spare storage capacity for rebuilding members after disk failures as indicated in step 302. The number of spare groups should be less than or equal to (N−W), where N is the total number of disks and W is the RAID width. FIG. 5B shows an example in which two groups (d, g) are reserved as spare capacity. In response to detection of a disk failure as shown in step 304, one of the spare groups is selected as shown in step 306. A spare group that contains a cell on the failed disk is selected, if possible, as shown in step 308. If there are multiple spare cells on the failed disk, then one spare cell and its container group are selected as shown in step 310. If there is no spare cell on the failed disk, then any spare group is selected as shown in step 312.

A target list is configured in step 400. The target list starts at the spare cell of the selected spare group characterized by the minimum row/disk index that is larger than the failed row/disk index (failed disk number). If no such row/disk index exists, then row 1 is used as the start of the target list. The target list is populated in step 402 by appending the cells of the selected spare group to the target list in order from the start by increasing row indices. The sequence is wrapped if the next row index is smaller than the failed row index.

A source list is generated in step 404 by selecting the RAID members on the failed disk. The order of selection may be either sequential by the cell indices or alphabetical by group letters. At least one order of selection will satisfy the RAID requirement that all members per RAID group are located on different disks, so both possibilities can be evaluated to find a satisfactory ordering. In step 406 the spare cells in the target list are assigned to the RAID members in the source list according to the sequential ordering of the source and target lists. The failed RAID members are rebuilt in their assigned spare cells.

Figure 6A:
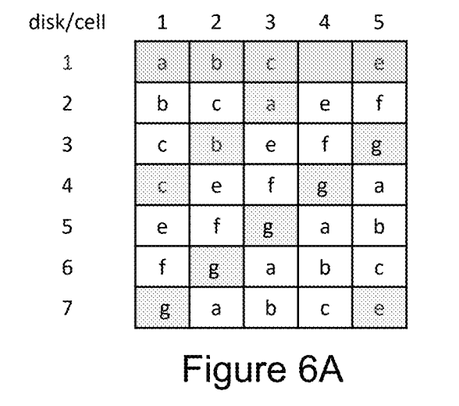
FIG. 6A illustrates assignment of spare cells to rebuild RAID members in response to failure of a first disk drive.

FIG. 6A illustrates assignment of spare cells to rebuild RAID members in response to failure of a first disk drive (1) that contains members (a, b, c, e). Spare group (d) (see FIG. 5B) is selected because it includes a member on the failed disk. The target list starts at disk 2, cell 3 because that disk has the minimum row index (2) that is larger than the failed row index (1). Appending spare cells in order by disk/row indices 2, 3, 4, 7 yields a target list of spare cells at cell indices 3, 2, 1, 5. The failed RAID members (a, b, c, e) are recovered to the spare cells of group (d) in the order of the disk indices (2, 3, 4, 7) from the starting row index. The failed spare cell (d) contains no data to be recovered. Spare group (g) remains intact for response to a second disk failure.

Figure 6B:
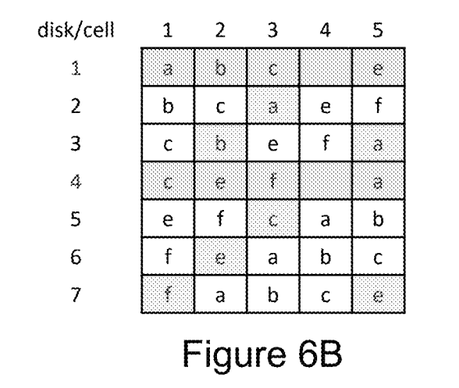
FIG. 6B illustrates assignment of spare cells to rebuild RAID members in response to failure of a second disk drive using cell index ordering.

FIG. 6B illustrates assignment of spare cells to rebuild RAID members in response to failure of a second disk drive (4) using cell index ordering. The failed RAID members (c, e, f, a) are recovered to the spare cells of group (g) (see FIG. 6A). The target list starts at disk 5, cell 3 because that disk has the minimum row index (5) that is larger than the failed row index (4). The RAID members (c, e, f, a) are assigned to the spare cells of group (g) in the order of increasing disk indices (5, 6, 7, 3) from the starting row index.

Figure 6C:
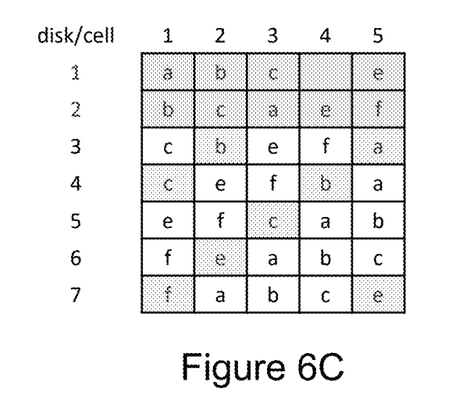
FIG. 6C illustrates assignment of spare cells to rebuild RAID members in response to failure of a second disk drive using alphabetic group letter ordering.

FIG. 6C illustrates assignment of spare cells to rebuild RAID members in response to failure of a second disk drive (2) using alphabetic group letter ordering. The failed RAID members (b, c, a, e, f) are recovered to the spare cells of group (g) (see FIG. 6A). The target list starts at disk 3, cell 5 because disk 3 has the minimum row index (3) that is larger than the failed row index (2). The RAID members are alphabetically sorted as (a, b, c, e, f) and assigned to the spare cells in the order of increasing disk indices (3, 4, 5, 6, 7) from the starting row index.

Figure 7:
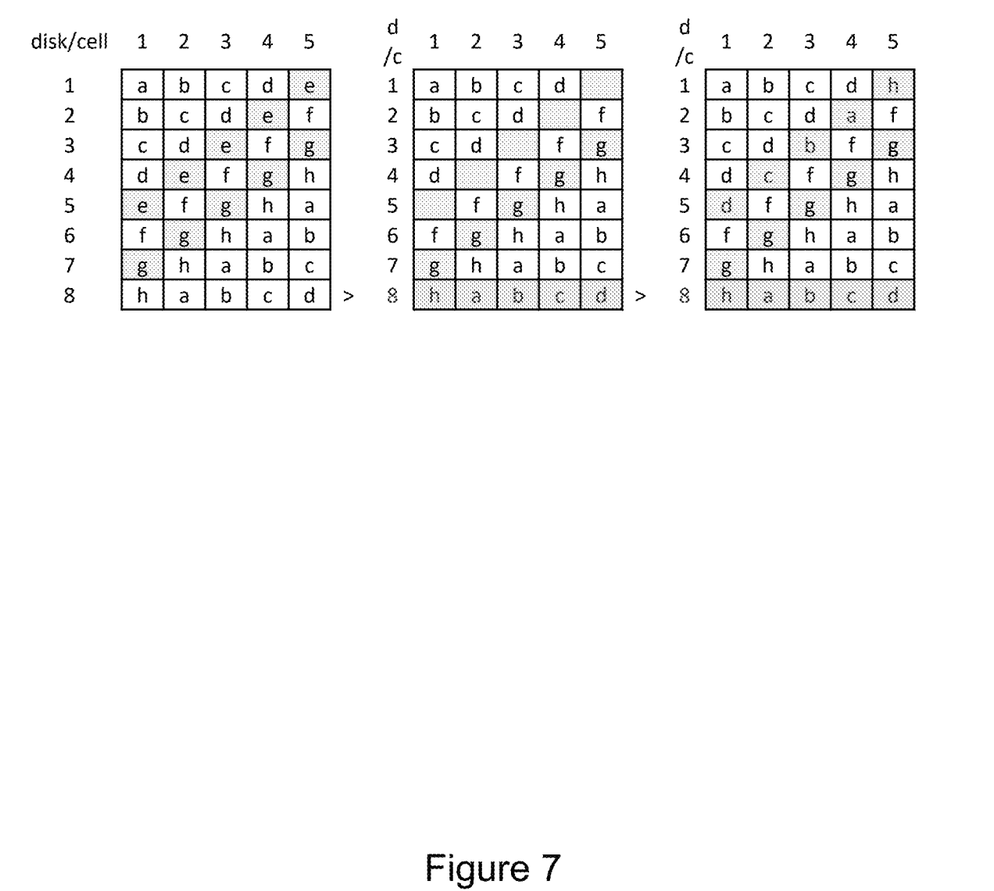
FIG. 7 illustrates assignment of spare cells to rebuild RAID members in response to failure of a disk drive that does not contain spare cells.

FIG. 7 illustrates assignment of spare cells to rebuild RAID members in response to failure of a disk drive (8) that does not contain spare cells. Spare group (e) is selected for recovery, although spare group (g) could alternatively be selected. The source list contains RAID members (h, a, b, c, d) in order. The target list contains spare cells (e) at disks (1, 2, 3, 4, 5) in order. Spare group (g) is intact, so it can be used for recovery from a subsequent disk failure.

Figure 8:
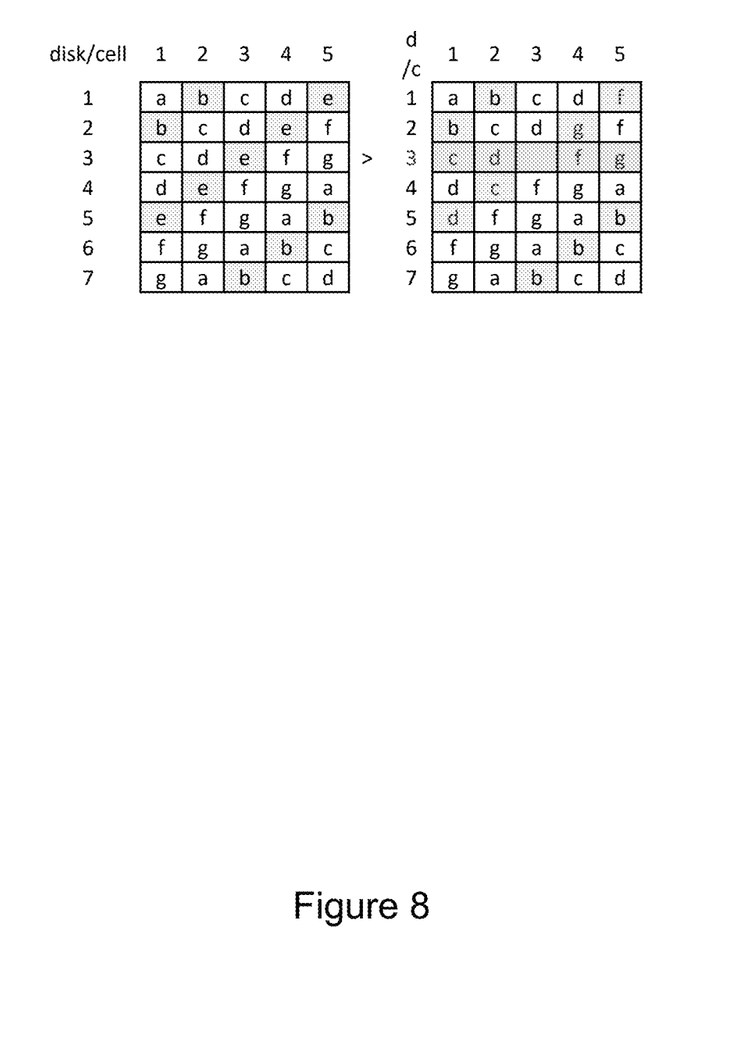
FIG. 8 illustrates assignment of spare cells to rebuild RAID members in response to failure of a disk drive that contains a single spare cell.

FIG. 8 illustrates assignment of spare cells to rebuild RAID members in response to failure of a disk drive (3) that contains a single spare cell. The illustrated array has two spare groups (b, e). Spare group (e) will be selected for recovery because failed drive 3 contains a member of spare group (e). The spare cell (e) on disk 3 does not need to be in the source list. The source list contains RAID members (c, d, f, g), in order. The target list contains spare cells (e) at disks (4, 5, 1, 2), in accordance with the algorithm. Spare group (b) remains intact.

Figure 9A:
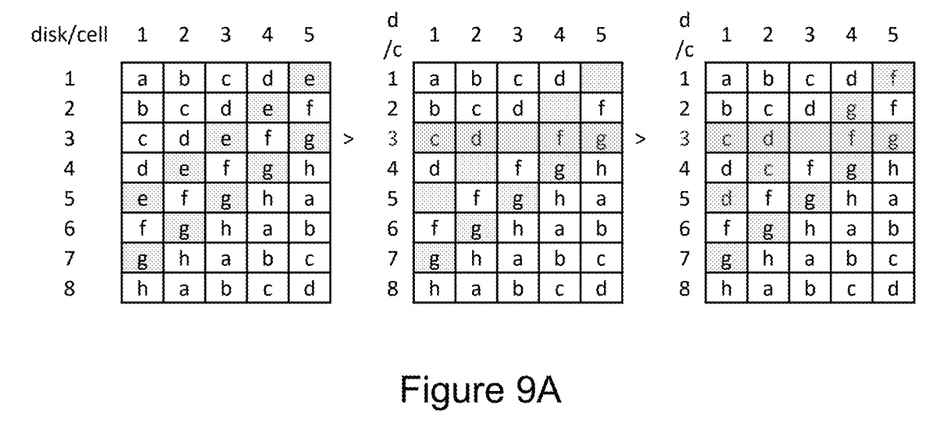
FIGS. 9A and 9B illustrate assignment of spare cells to rebuild RAID members in response to failure of a disk drive that contains multiple spare cells.
Figure 9B:
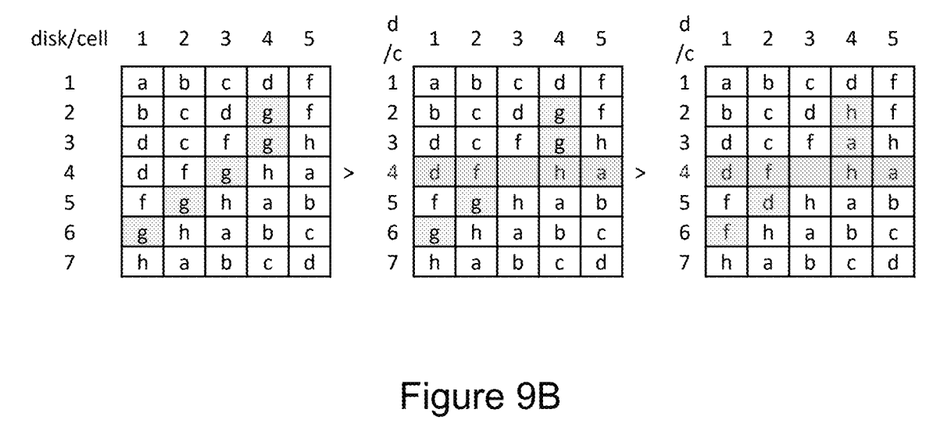

FIGS. 9A and 9B illustrate assignment of spare cells to rebuild RAID members in response to failure of a disk drive that contains multiple spare cells. The array initially has two spare groups (e, g). Disk 3 fails, and it contains cells of both spare groups. Either spare group can be selected. If group (e) is selected for recovery, the source list contains RAID members (c, d, f, g). The target list contains spare cells (e) at disks (4, 5, 1, 2). The spare assignment is shown in the right-side matrix of FIG. 9A. A spare cell of group (e) (disk 2) is re-assigned to group (g), which can be used for recovery from a subsequent failure. FIG. 9B shows the array without the failed disk and the remaining disks sequentially renumbered. The remaining array can recover from a subsequent disk failure. If disk 4 fails, for example, its RAID members (d, f, h, a) are placed in the source list. The target list contains spare cells at disks (5, 6, 2, 3). The list starts at disk 5 because that is the first disk that is numbered greater than the failed disk, which is disk 4. The list is sorted in ascending order by disk indices, which wrap around to the lowest disk index, which is disk 2. The assignment of spare cells is shown in the right-side matrix of FIG. 9B.

Specific examples have been presented to provide context and convey inventive concepts. The specific examples are not limiting. A wide variety of modifications may be made without departing from the scope of the inventive concepts described herein. Moreover, the features, aspects, implementations, and embodiments described herein may be combined in any technically possible way. Accordingly, modifications and combinations are within the scope of the following claims.

What is claimed is:

1. An apparatus, comprising:
    at least one compute node configured to manage access of the non-volatile drives, the at least one compute node comprising at least one processor and non-transitory computer-readable memory; and
    a Redundant Array of Independent Drives (RAID) controller adapted to:
        configure the drives with same-size cells as elements of a matrix adapted to be represented by sequentially numbered drive rows and sequentially numbered cell index columns, sequentially numbered groups of the cells distributed along matrix diagonals characterized by sequentially increasing cell indices and sequentially decreasing drive indices, both wrapping;
        reserve a plurality of the groups as spare groups; and
        responsive to failure of one of the drives:
            select one of the spare groups;
            create an ordered target list of spare cells of the selected spare group;
            create an ordered source list of cells containing protection group members on the failed drive; and
            assign ones of the spare cells to ones of the cells containing protection group members on the failed drive and rebuild the protection group members in the assigned spare cells.

2. The apparatus of claim 1 further comprising the RAID controller configured to distribute the sequentially numbered groups as group number=((row number−1)+(column number−1)) modulo (N), where N is a total number of the drives.

3. The apparatus of claim 1 further comprising the RAID controller configured to select one of the spare groups by preferentially selecting one of the spare groups that contains a spare cell of the failed drive.

4. The apparatus of claim 1 further comprising the RAID controller configured to create the ordered target list of spare cells of the selected spare group by starting the target list at the spare cell of the selected spare group that satisfies a condition of having a minimum drive index that is greater than the failed drive index and starting the target list at row 1 if no drive index satisfies the condition.

5. The apparatus of claim 4 further comprising the RAID controller configured to create the ordered source list of cells containing protection group members on the failed drive by selecting the cells in sequential order by cell indices.

6. The apparatus of claim 5 further comprising the RAID controller configured to create the ordered source list of cells containing protection group members on the failed drive by selecting the cells in alphabetical by group-representing letters.

7. The apparatus of claim 6 further comprising the RAID controller configured to create the ordered source list of cells containing protection group members on the failed drive by determining which of either selection by sequential cell indices or alphabetical by group-representing letters results in no more than one member of each group residing on a single one of the drives.

8. A method comprising:
    configuring an array of non-volatile drives with same-size cells as elements of a matrix adapted to be represented by sequentially numbered drive rows and sequentially numbered cell index columns, sequentially numbered groups of the cells distributed along matrix diagonals characterized by sequentially increasing cell indices and sequentially decreasing drive indices, both wrapping;
    reserving a plurality of the groups as spare groups; and
    responsive to failure of one of the drives:
        selecting one of the spare groups;
        creating an ordered target list of spare cells of the selected spare group;
        creating an ordered source list of cells containing protection group members on the failed drive; and
        assigning ones of the spare cells to ones of the cells containing protection group members on the failed drive and rebuild the protection group members in the assigned spare cells.

9. The method of claim 8 further comprising distributing the sequentially numbered groups as group number=((row number−1)+(column number−1)) modulo (N), where N is a total number of the drives.

10. The method of claim 8 further comprising selecting one of the spare groups by preferentially selecting one of the spare groups that contains a spare cell of the failed drive.

11. The method of claim 8 further comprising creating the ordered target list of spare cells of the selected spare group by starting the target list at the spare cell of the selected spare group that satisfies a condition of having a minimum drive index that is greater than the failed drive index and starting the target list at row 1 if no drive index satisfies the condition.

12. The method of claim 11 further comprising creating the ordered source list of cells containing protection group members on the failed drive by selecting the cells in sequential order by cell indices.

13. The method of claim 12 further comprising creating the ordered source list of cells containing protection group members on the failed drive by selecting the cells in alphabetical by group-representing letters.

14. The method of claim 13 further comprising creating the ordered source list of cells containing protection group members on the failed drive by determining which of either selection by sequential cell indices or alphabetical by group-representing letters results in no more than one member of each group residing on a single one of the drives.

15. A non-transitory computer-readable storage medium with instructions that when executed by a computer perform a method comprising:
    configuring an array of drives with same-size cells as elements of a matrix adapted to be represented by sequentially numbered drive rows and sequentially numbered cell index columns, sequentially numbered groups of the cells distributed along matrix diagonals characterized by sequentially increasing cell indices and sequentially decreasing drive indices, both wrapping;

reserving a plurality of the groups as spare groups; and responsive to failure of one of the drives:
- selecting one of the spare groups;
- creating an ordered target list of spare cells of the selected spare group;
- creating an ordered source list of cells containing protection group members on the failed drive; and
- assigning ones of the spare cells to ones of the cells containing protection group members on the failed drive and rebuild the protection group members in the assigned spare cells.

16. The non-transitory computer-readable storage medium of claim 15 in which the method further comprises distributing the sequentially numbered groups as group number=((row number−1)+(column number−1)) modulo (N), where N is a total number of the drives.

17. The non-transitory computer-readable storage medium of claim 16 in which the method further comprises selecting one of the spare groups by preferentially selecting one of the spare groups that contains a spare cell of the failed drive.

18. The non-transitory computer-readable storage medium of claim 17 in which the method further comprises creating the ordered target list of spare cells of the selected spare group by starting the target list at the spare cell of the selected spare group that satisfies a condition of having a minimum drive index that is greater than the failed drive index and starting the target list at row 1 if no drive index satisfies the condition.

19. The non-transitory computer-readable storage medium of claim 18 in which the method further comprises creating the ordered source list of cells containing protection group members on the failed drive by selecting the cells in sequential order by cell indices.

20. The non-transitory computer-readable storage medium of claim 19 in which the method further comprises creating the ordered source list of cells containing protection group members on the failed drive by selecting the cells in alphabetical by group-representing letters.

\* \* \* \* \*